(12) United States Patent
Tran et al.

(10) Patent No.: US 11,066,583 B2
(45) Date of Patent: Jul. 20, 2021

(54) ADMIXED MODIFIERS FOR ADHESIVES

(71) Applicant: U.S. Army Research Laboratory, Adelphi, MD (US)

(72) Inventors: Ngon T. Tran, Aberdeen, MD (US); Matthew A. Bartucci, Baltimore, MD (US); Joshua A. Orlicki, Havre de Grace, MD (US); Daniel B. Knorr, Jr., Oxford, PA (US); Joseph L. Lenhart, Port Deposit, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 107 days.

(21) Appl. No.: 16/104,329

(22) Filed: Aug. 17, 2018

(65) Prior Publication Data

US 2019/0055441 A1    Feb. 21, 2019

Related U.S. Application Data

(60) Provisional application No. 62/546,645, filed on Aug. 17, 2017.

(51) Int. Cl.
| | |
|---|---|
| *C09J 11/08* | (2006.01) |
| *C09J 175/04* | (2006.01) |
| *C09J 175/02* | (2006.01) |
| *C09J 133/04* | (2006.01) |
| *C09J 163/00* | (2006.01) |
| *C09J 175/16* | (2006.01) |

(52) U.S. Cl.
CPC .......... *C09J 175/04* (2013.01); *C09J 133/04* (2013.01); *C09J 163/00* (2013.01); *C09J 175/02* (2013.01); *C09J 175/16* (2013.01)

(58) Field of Classification Search
CPC .............. C09J 11/00; C09J 11/06; C09J 11/08
USPC ................................................ 156/326, 327
See application file for complete search history.

(56) References Cited

U.S. PATENT DOCUMENTS

| | | | | |
|---|---|---|---|---|
| 2013/0029087 | A1* | 1/2013 | Hatanaka | C08L 33/062 428/98 |
| 2018/0298249 | A1* | 10/2018 | Wilker | C09J 133/10 |
| 2019/0203080 | A1* | 7/2019 | Wilker | C08F 220/1804 |

FOREIGN PATENT DOCUMENTS

KR    20080057118 A  *  6/2008  ............... C08K 9/04

OTHER PUBLICATIONS

Machine translation of KR-20080057118-A (no date).*
"Synthesis and Characterization of Aminopropyltriethoxysilane-Polydopamine Coatings," by Knorr, D.B., Jr.; Tran, N. T.; Gaskell, K.J.; Orlicki, J.A.; Woicik, J.C.; Jaye, C.; Fischer, D.A.; Lenhart, J.L. (Langmuir, 32, 2016, 4370-4381).
"Polydopamine and Polydopamine-Silane Hybrid Surface Treatments in Structural Adhesive Applications," by Tran, N.T.; Flanagan, D.P.; Orlicki, J.A.; Lenhart, J.L.; Proctor, K.L.; Knorr, D.B., Jr. (Langmuir, 34, 2018, 1274-1286).
"Side chain length impacting thermal transitions and water uptake of acrylate—maleimide copolymers with pendent catechols," by Bartucci, M.A.; Napadensky, E.; Lenhart, J.L.; Orlicki, J.A. (RSC Adv., 7, 2017, 49114-49118).
Power Point Presentation titled "Elucidating Tg and Polarity Effects in Bioinspired Catechol Synthetic Adhesives Towards Improved Interfacial Adhesion" by Mathew A. Bartucci, Joshua A. Orlicki and Joseph L. Lenhart dated Aug. 21, 2016.
Power Point Presentation titled "Hybrid Aminopropyltriethoxysilane-Polydopamine Coatings and Their Adhesive Properties" by MNgon T. Tran and Daniel B. Knorr made at the 252nd ACS Meeting in Philadelphia on Aug. 21-25, 2016.
Poster titled "Synthetic Adhesives with Catechol Functionality—An Integrated Approach to Mechanism Elucidation" by Joshua A. Orlicki, Mathew A. Bartucci et al. (No Date).

* cited by examiner

*Primary Examiner* — Michael J Feely
(74) *Attorney, Agent, or Firm* — Christos S. Kyriakou (57) ABSTRACT

Disclosed is a method for improving interfacial adhesion of an adhesive to unprimed substrates and an improved adhesive composition, involving admixing an adhesive with an adhesive modifier, where the modifier is at least partially soluble in the at least one adhesive and includes either a non-aromatic polyol or a molecule having at least one ortho-hydroxyl substitution on a benzene ring.

7 Claims, 7 Drawing Sheets

R = OH, OMe, Me, F

ADMIXED MODIFIERS FOR ADHESIVES

CROSS-REFERENCE TO RELATED APPLICATIONS

This application claims priority to and the benefit of U.S. Provisional Application 62/546,645 titled "ADMIXED MODIFIERS FOR ADHESIVES FOR IMPROVED INTERFACIAL ADHESION TO UNPRIMED SUBSTRATES" filed on Aug. 17, 2017. The entirety of, including all attachments filed with U.S. Provisional Application 62/546,645, which is hereby incorporated by reference herein.

STATEMENT OF GOVERNMENT INTEREST

The invention described herein may be manufactured, used, and/or licensed by or for the United States Government.

BACKGROUND

All adhesives eventually delaminate from targeted substrates, and environmental conditions play a major role in determining the time before delamination occurs. This delamination is accelerated by extreme climatic environments (e.g. hot/wet conditions). Traditionally, combating this delamination is accomplished by applying a surface primer on the targeted substrates before adhesive application. This requires significantly increased processing times.

Thus, a technique for improving adhesion to unprimed substrates, that does not require significantly increased processing times, is desirable.

SUMMARY OF THE INVENTION

The present invention is drawn to a method for improving interfacial adhesion of an adhesive to unprimed substrates. In particular the method is drawn towards the use of adhesive modifiers with particular characteristics with the adhesive to improve adhesion without requiring priming a substrate's surface.

Disclosed is a method for improving interfacial adhesion of an adhesive to unprimed substrates, involving admixing an adhesive with an adhesive modifier, where the modifier is at least partially soluble in at least one component of the adhesive formulation and includes either a non-aromatic polyol with a number of alcohols of 2 or greater or a molecule having at least one ortho-hydroxyl substitution on a benzene ring.

Advantageously, the adhesive may be an epoxy (for example a diglycidyl ether of Bisphenol-A (DGEBA)-based resin), an acrylate-based adhesive, a thermoplastic elastomer (TPE), or a thermoplastic urethane or ureas (TPU).

Also advantageously, the adhesive modifier may include a dopamine, a maleimide-dopamine monomer, tris, or a derivative thereof.

It is further advantageous when the adhesive modifier is a copolymer of a monomer having an ortho-hydroxyl substitution on a benzene ring, such as a maleimide-dopamine monomer or derivative, and an acrylate monomer, such as an acrylate with a branched or straight alkyl side chain of between 1 and 12 carbons. In particular, it is advantageous when the copolymer is a polymeric acrylate-maleimide or derivative thereof.

It may be advantageous for copolymers where the mole fraction of the monomer having an ortho-hydroxyl substitution on a benzene ring in the copolymer is between 0.1 and 0.5. It is also advantageous for the adhesive modifier to be present in the total formulation mass in an amount less than 0.5% by weight, and when present in a two-part epoxy including a curing agent, for the adhesive modifier to be mixed into the curing agent.

Further disclosed is an improved adhesive, which includes a baseline adhesive formulation and an adhesive modifier present in an amount less than 2% by weight of the total weight of the improved adhesive, where the adhesive modifier utilizes a copolymer of a monomer having an ortho-hydroxyl substitution on a benzene ring and an acrylate monomer.

Advantageously, the monomer having an ortho-hydroxyl substitution on a benzene ring may be a dopamine monomer, a maleimide-dopamine monomer, or a derivative thereof.

Also advantageously, the acrylate monomer may be a branched or straight alkyl side chain of between 1 and 12 carbons.

It may be advantageous for the mole fraction of the monomer having an ortho-hydroxyl substitution on a benzene ring in the copolymer to be between 0.1 and 0.5.

It is also advantageous that the baseline adhesive may be selected from the group consisting of an epoxy, an acrylate-based adhesive (to also include methacrylates, more broadly alkyl-acrylates, cyanoacrylates, hydroxyl-ethyl methacrylates, etc.), a thermoplastic elastomers (TPE), and a thermoplastic urethane or urea (TPU).

It is further advantageous that the adhesive modifier may be present in an amount less than 2% by weight of the total weight of the improved adhesive, and more advantageous when it is present in an amount less than 1.0% by weight of the total weight of the improved adhesive, and still more advantageous when it is present in an amount between 0.1% and 0.6% by weight of the total weight of the improved adhesive.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale.

Descriptions of well-known components and processing techniques are omitted so as to not unnecessarily obscure the embodiments of the invention. The examples used herein are intended merely to facilitate an understanding of ways in which the embodiments of the invention may be practiced and to further enable those skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "about" as used herein refers to values ±5%, so "about 0.5%" would include values greater than or equal to 0.475% and less than or equal to 0.525%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is drawn to an adhesive having an improved interfacial adhesion to unprimed substrates.

Figure 1:
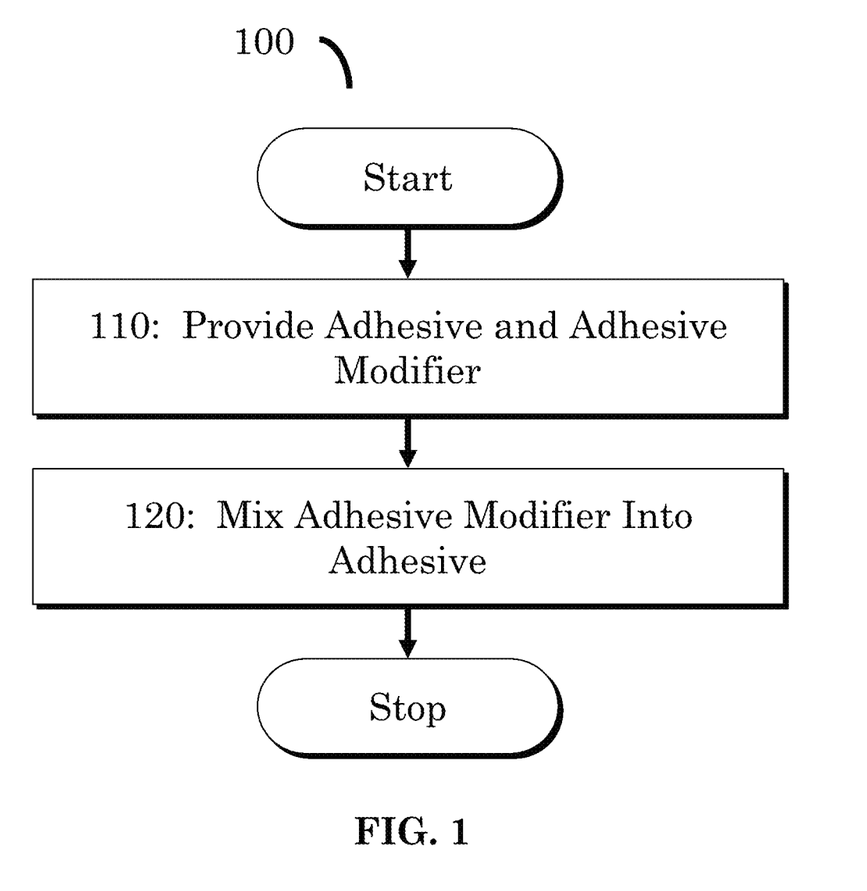
FIG. 1 is a flowchart describing a method for producing an improved adhesive.

Referring to FIG. 1, the method (100) begins by providing (110) at least one adhesive and an adhesive modifier.

There is generally no limitation on the adhesive that may be employed. In various embodiments the adhesive may be an epoxy, including but not limited to those having a diglycidyl ether of Bisphenol-A (DGEBA)-based resin. In other embodiments, the adhesive may utilize an acrylate-based adhesive, a thermoplastic elastomer (TPE), or a thermoplastic urethane or ureas (TPU).

The adhesive modifier must be at least partially soluble in the adhesive. Further, the adhesive modifier should include a non-aromatic polyol or a molecule having at least one ortho-hydroxyl substitution on a benzene ring.

In certain embodiments of where the adhesive modifier includes a non-aromatic polyol, the polyol contains a primary amine. In other embodiments, the polyol contains between 2 and 4 hydroxyl groups. And in still more preferred embodiments, the polyol is tris.

Figure 2A:
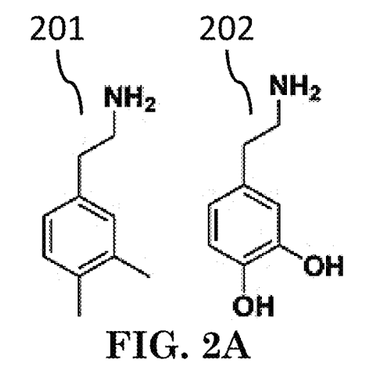
FIGS. 2A-2C are molecular structures of various adhesive modifiers that can be utilized in the present invention.
Figure 2B:
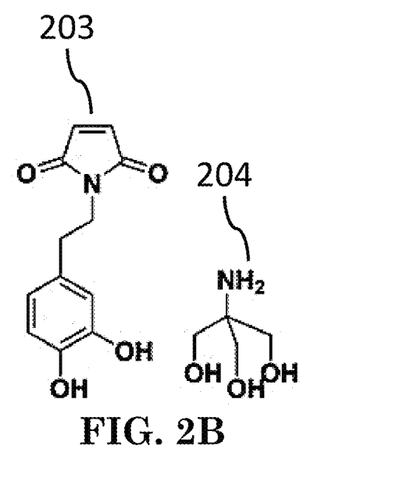
Figure 2C:
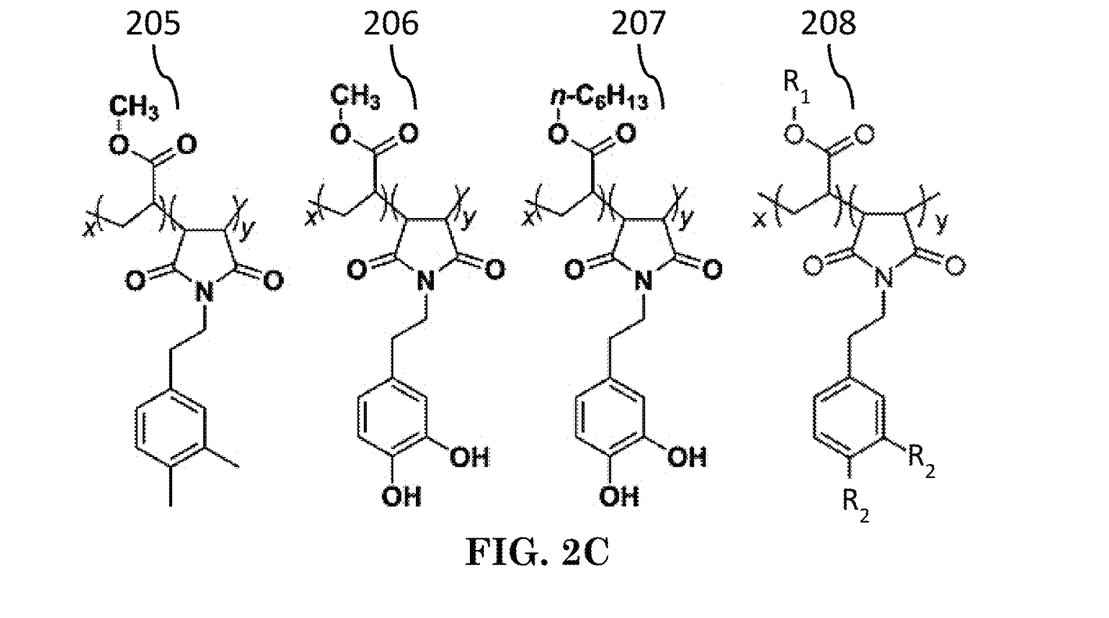

Structures of various non-limiting embodiments of molecules having at least one ortho-hydroxyl substitution on a benzene ring that can be used as adhesive modifiers can be seen in FIGS. 2A-2C. In FIG. 2A, the modifiers include dopamine (202) ("dopa") and a dimethyl analog to dopa (201), 2-(3,4-Dimethylphenyl)ethanamine ("M-control"). In FIG. 2E, the modifiers include maleimide-dopamine (203) ("maleimide" in FIGS. 5A and 5B) and tris (204). FIG. 2C shows several polymeric adhesive modifiers, based on polymeric acrylate-maleimides (PAMs), that incorporate the maleimide-catechol residue or analog in a copolymer with acrylates with varying length of alkyl side chain. A variant using a methyl group and the dopamine analog residue (205) ("P-control") is shown alongside dopamine residue variants with methyl (206) ("P-methyl") and hexyl (207) ("P-hexyl") groups. A more generic structure is also shown (208) where $R_1$ is a branched or straight alkyl side chain of between 1 and 12 carbons, typically a methyl, ethyl, butyl, hexyl, or 2-ethylhexyl, and $R_2$ is typically either a methyl, hydroxyl, or methoxy group, or a fluorine. In preferred embodiments, $R_2$ is a hydroxyl group. Other polymeric structures are also envisioned.

In embodiments using acrylates, some non-limiting examples of the polymerizable acrylate monomers which may be used include acrylic acid, methacrylic acid; alkyl acrylates (e.g., methyl acrylate, ethyl acrylate, etc.); cycloaliphatic acrylates (e.g. isobornyl acrylate); typical alkyl methacrylates (e.g., methyl methacrylate, butyl methacrylate); functional methacrylates (e.g., acrylic acid, hydroxyethyl methacrylate (HEMA)); cycloaliphatic methacrylates (e.g., cyclohexyl methacrylate; iso-bornyl methacrylate); aryl methacrylates (e.g., phenyl methacrylate; benzyl methacrylate; bisphenol dimethacrylates); functional methacrylates (e.g., 2-hydroxyethyl methacrylate; 4-methacryloxyethoxybenzaldehyde; 4-methacryloxyethoxybenzoic acid); ethylene glycol dimethacrylate; diethylene glycol dimethacrylate; triethylene glycol dimethacrylate; tetraethylene glycol dimethacrylate; polyethylene glycol and polypropylene glycol dimethacrylates; ethoxylated and propoxylated bisphenol dimethacrylates; neopentyl glycol dimethacrylate; trimethylolpropane trimethacrylate; 1,6-hexanediol-, 1,10-decanediol and 1,4-cyclohexanediol dimethacrylates; pentaerythritol tetramethacrylate; 1,10-decamethylene dimethacrylate; 1H, 1H-pentadecafluoroctyl methacrylate; 2,2-bis[p-(2'-hydroxy-3-methacryloxypropoxy)phenyl]propane, i.e. bis-GMA; and various nonhydroxylated homologs of bis-GMA e.g. 2,2-bis[p-(2'-methacryloxyethoxy)phenyl]propane; various diurethane dimethacrylates (e.g., the diadduct of 2-hydroxyethyl methacrylate and trimethylhexamethylene diisocyanate), oligomeric urethanes with multifunctional methacrylate groups (e.g. urethane derivatives of bis-GMA and aliphatic and cycloaliphatic diisocyanates), and other prepolymer types of monomers (e.g., siloxane multifunctional methacrylates; polyfluorinated oligomeric multifunctional methacrylates) and the like. Mixtures of the above and other acrylate monomers or other copolymerizable monomers (such as any vinyl monomer capable of free radical polymerization, e.g., styrene, α-methylstyrene, vinyl biphenyl, vinyl acetate, pentafluorostyrene, and similar olefinic monomers) also may be used.

Figure 3A:
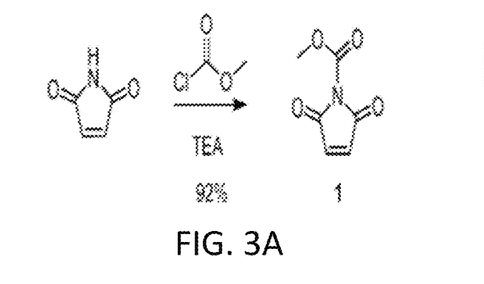
FIGS. 3A-3D are embodiments of a method for producing an adhesive modifier.
Figure 3B:
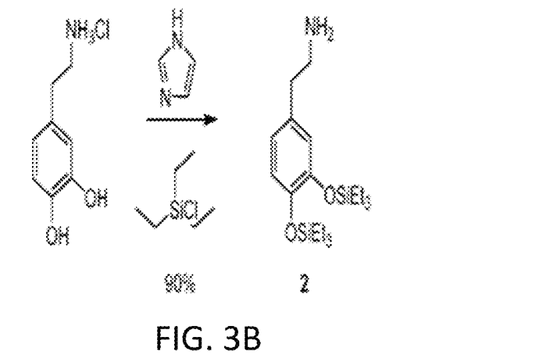
Figure 3C:
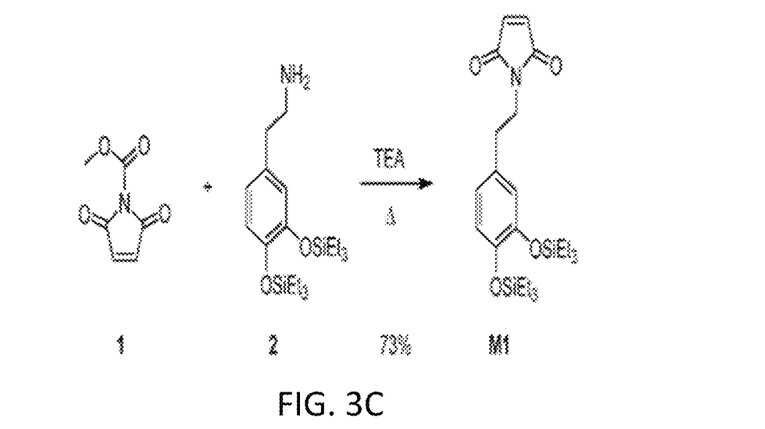

One example method for producing such a structure is illustrated in FIG. 3A-3D. Initially, the maleimide intermediate component (FIG. 3A, Reference "1") is produced (FIG. 3A) by reacting maleimide in the presence of methylchloroformate and triethylamine (TEA). Separately, the dopamine intermediate component is protected by trialkyl silanes (FIG. 3B, Reference "2") is produced by reacting dopamine hydrochloride in the presence of imidazole and triethylchlorosilane. These two intermediate components are then reacted in the presence of TEA and heat to generate a maleimide-dopamine protected by trialkylsilanes (FIG. 3C, Reference "M1").

Figure 3D:
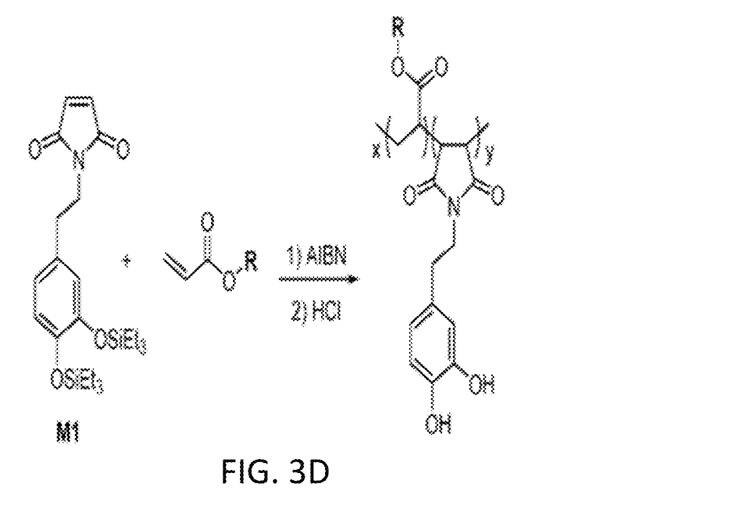

As shown in FIG. 3D, that intermediate is then copolymerized with an alkyl acrylate using azobisisobutyronitrile (AIBN). Since the unprotected catechol is a free radical scavenger, the phenols of monomer 1 (M1) shown in FIG. 3D were silane protected to allow for radical propagation. After the polymer was isolated, the protecting groups were removed via addition of small amounts of concentrated hydrochloric acid. While catechol surface binding, adhesion, and the formation of metal-catechol complexes have shown dependence on pH, this relationship is very much dependent on the local media and substrate surface energies. Under the conditions reported here, if the various PAMs were left in an acidic environment they discolored (oxidized) after a week. To remove excess acid after the deprotection, the PAMs were precipitated into water from THF three times. The pH of the precipitate solution was measured to ensure a range between 6-7. After precipitation into water, the PAMs were dried under vacuum (0.17 Torr) for a minimum of five (5) hours to afford off white powders in good to moderate yields.

Still referencing FIG. 3D, using a free radical polymerization route with a 1:1 acrylate to maleimide monomer (1) feed ratio allowed for approximate sequence and composition control of the PAMs. Due to the free radical copolymerization reactivity ratios of similar acrylates and maleimide monomers, it was expected that the sequence should be alternating with the acrylates (x) having a mildly higher affinity to polymerize with themselves (e.g. xyxy and xxyxxy). Although there are reports that maleimide-based monomers (y) can homopolymerize under select conditions, the propensity to alternate reaction with the acrylates was preferred. Thus, adjacent catechols in the resulting backbone sequence should be minimized. This is reflected in the final polymer repeat unit stoichiometry x:y ratios (53:47) observed via 1H NMR as the percentage of maleimide is consistent (within 3%) for this class of PAMs. The catechol spacing, along with the two carbon linker from the succinimide nitrogen, is similar in connectivity to the naturally occurring Dopa residue, and should provide sufficient free volume for potential catechol interaction when adsorbed onto a surface. Also, the mechanics of the polymers should be similar as the Mn for the silyl-protected PAMs are all above 100 kDa, which exceeds the molecular weight of entanglement for acrylates (see Table, below).

In the table below, yields are of deprotected polymers over two steps. $M_n$ and PDIs were taken of silyl-protected polymers as catechol system appeared to stick to GPC column, and the contact angle (CA) shown is the advancing contact angle with water.

| R | Yield | $M_n$ (kDa) | PDI | CA |
| --- | --- | --- | --- | --- |
| Methyl | 67% | 144 | 2.55 | 60.2 ± 1.6 |
| Ethyl | 88% | 136 | 3.80 | 63.1 ± 1.7 |
| Butyl | 93% | 134 | 3.85 | 70.8 ± 0.9 |
| Hexyl | 73% | 118 | 3.27 | 88.9 ± 2.1 |
| 2-Ethylhexyl | 69% | 124 | 2.24 | 93.8 ± 2.6 |

In some embodiments, such as for acrylates or methacrylates, the mole fraction of the molecule having at least one ortho-hydroxyl substitution on a benzene ring, such as dopamine, in the backbone will be a fraction of reactivity ratios. In such embodiments, this fraction will typically be between 0.1 and 0.5. For example, preferably embodiments of PAMs are near 0.47 fraction of the maleimide dopamine (typically between 0.45 and 0.5), although this falls to around 0.3 (typically 0.25 to 0.35) in the case of methacrylates.

Figure 4A:
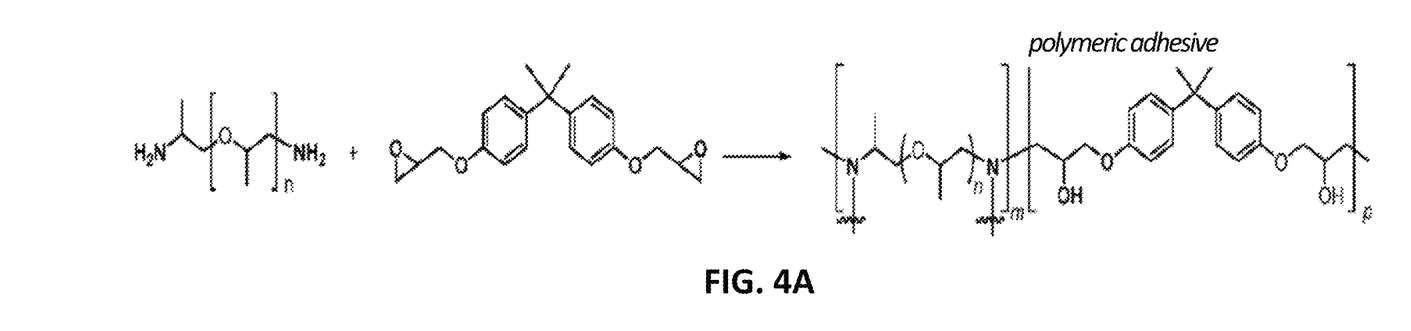
FIG. 4A is an example reaction forming a polymeric adhesive.
Figure 4B:
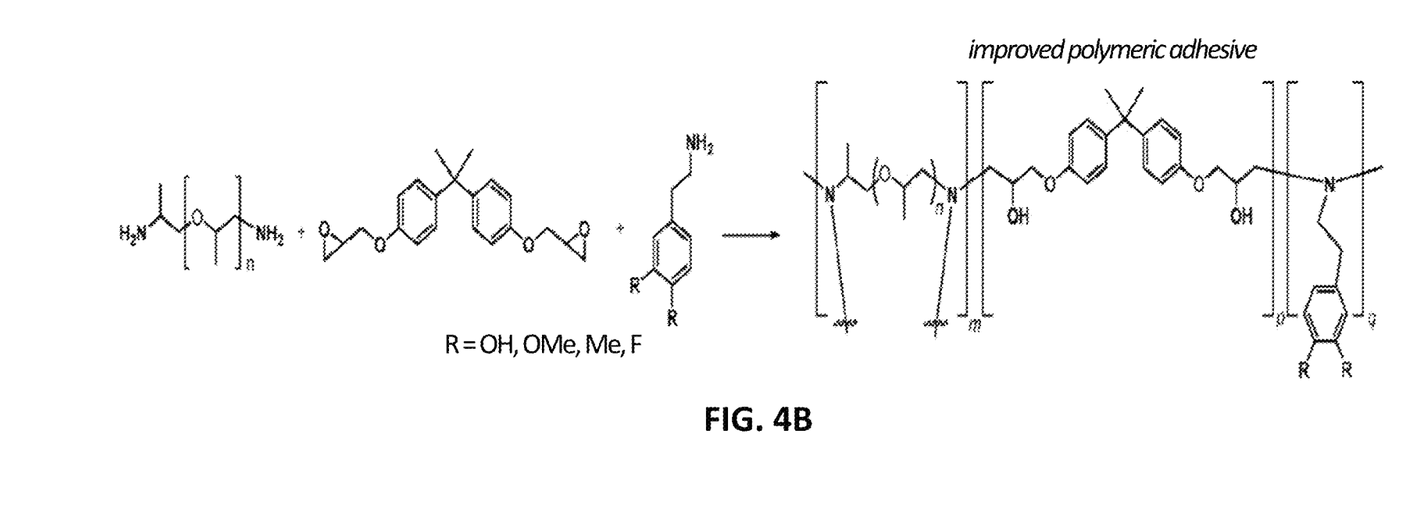
FIG. 4B is an example reaction forming an improved polymeric adhesive utilizing one embodiment of a small molecule additive.

Once the adhesive and adhesive modifier is provided, the adhesive modifier is mixed into the adhesive. Referring to FIGS. 4A and 4B, an example of this is shown. In FIG. 4A, a polymeric adhesive is formed using JEFFAMINE® D230 polyetheramine as the amine component (curing agent) in a DGEBA-based epoxy. In one example, D230 (12.23 g, 0.053 mmol, 1.00 equiv) was added to a 60 mL jar containing DGEBA (37.77 g, 0.106 mmol, 2.00 equiv) at 35° C. After stirring for 5-10 min, the resulting solution was degassed for 10 min at −80 kPa and 35° C. in a vacuum oven (Yamato ADP 200C). At atmospheric pressure, the solution was heated at 35° C. for 2.3 h and then 40° C. for 1 h. The transparent, colorless, and viscous solution was allowed to reach room temperature over 0.5 h. In FIG. 4B, an additive (here, a dopamine residue where R is a hydroxyl group) was identified and mixed into the amine component, forming the improved polymeric adhesive. Other embodiments, where R was selected to form methoxy, methyl, and fluorinated analogs were also utilized.

Figure 5A:
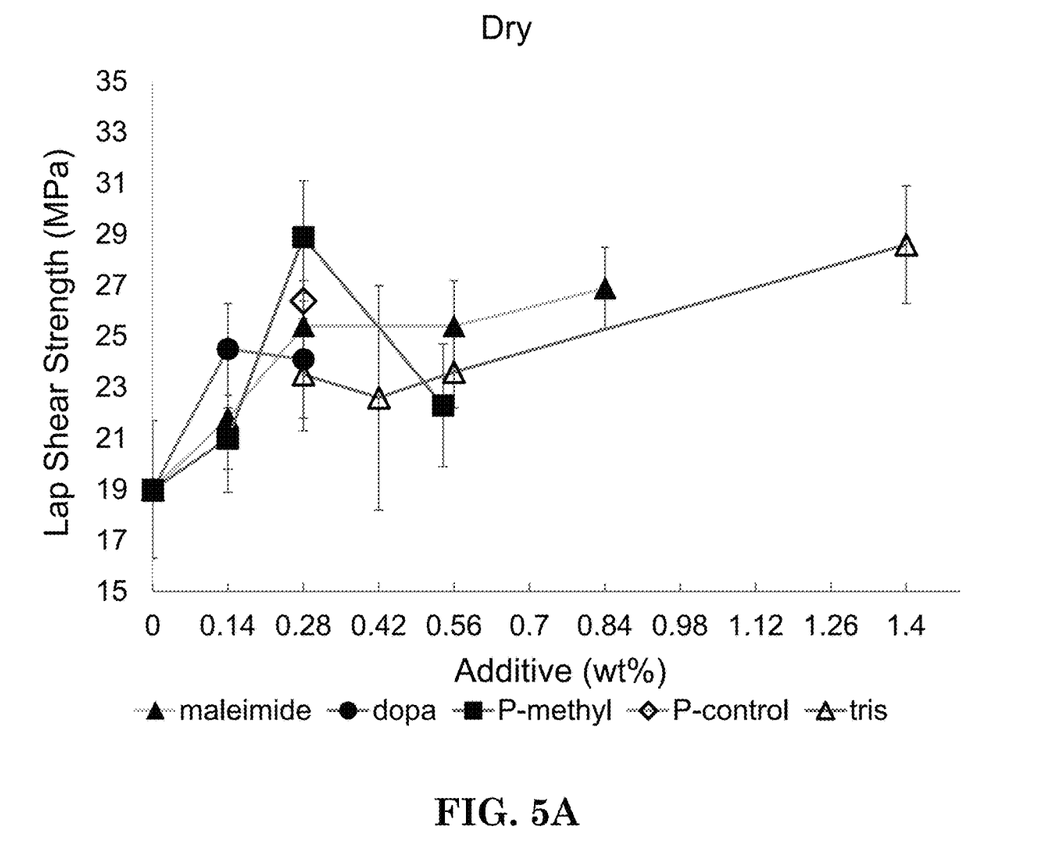
FIG. 5A is a graph showing lap-shear performance of adhesives varying with increasing concentrations of various adhesive modifiers under dry conditions.
Figure 5B:
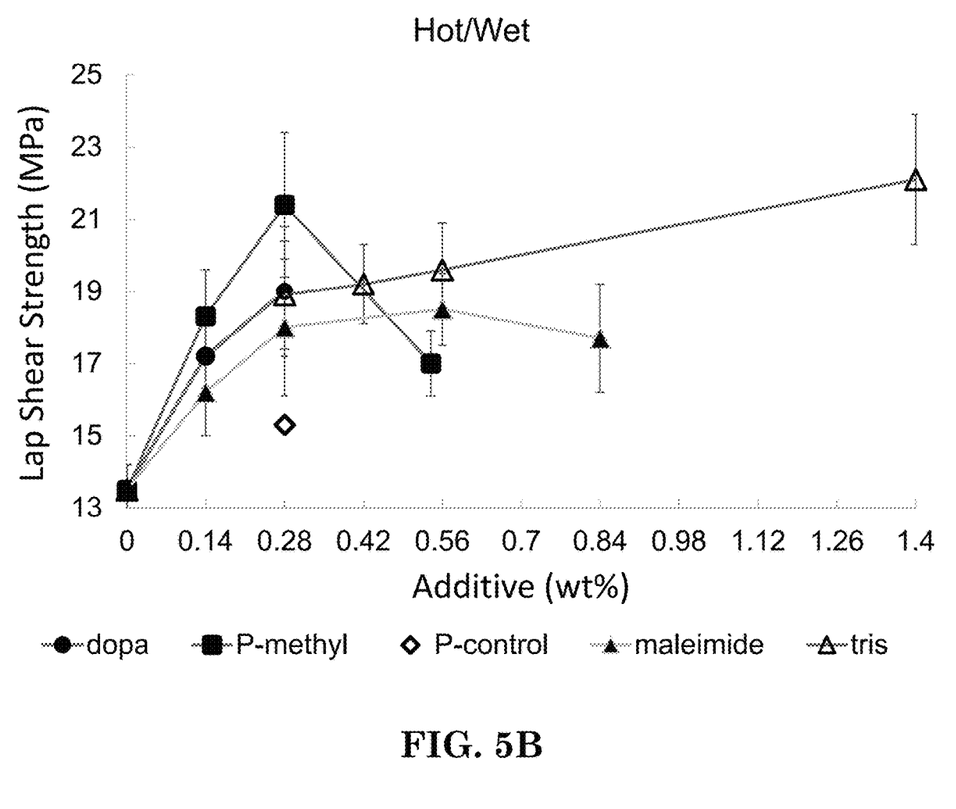
FIG. 5B is a graph showing lap-shear performance of adhesives varying with increasing concentrations of various adhesive modifiers under hot/wet conditions.

As shown in FIGS. 5A and 5B, even very small amounts of the adhesive modifier can significantly improve the adhesive properties of an adhesive. In FIG. 5A, various adhesive modifiers were tested on aluminum substrates for lap shear (ASTM D1002 10) performance in dry conditions as a function of additive loading in the formulation (normalized to the maleimide-catechol content). In FIG. 5B, the same adhesive modifiers were tested after the lap shear specimens have been conditioned under the hot-wet environment, so-called because the specimens were maintained for two weeks submerged in water at 60° C. As can be seen in both figures, there is significant performance gains even from very low levels of adhesive modifier. For example, a maximum lap shear strength in both cases can be seen with 0.28 wt % of the PAM having a methyl residue (See FIG. 2C, Reference 206). Other variants similarly show improved performance even at levels of the adhesive modifier between 0.1 wt % and 1.0 wt %. In certain embodiments, the adhesive modifier is present in the total formulation mass in an amount less than about 2% by weight, preferably less than about 1.5% by weight, more preferably less than about 1% by weight, and still more preferably less than about 0.6% by weight. In certain embodiments, the adhesive modifier is present in an amount between about 0.1% and 0.6% by weight.

As shown, a series of synthetic catechol-containing polymers have been prepared, and used as a modifier to a model epoxy adhesive formulation. The modified epoxy in the above example has shown about a 50% improvement in lap shear strength for minimally prepared alumina substrates over the baseline epoxy, and a nearly 60% improvement for specimens maintained in "hot-wet" conditions. The performance of the modified epoxy on the bare alumina substrate is comparable to a substrate prepared with reactive alkoxy silane (aminopropyltriethoxy silane, APTES), which is the industry standard.

This improved adhesive performance can allow for increased fabrication throughput (due to, e.g., reduced surface preparation times), improved composite repair, and improved performance in hot-wet conditions.

Extensive characterization of polydopamine-alkylsilane surface treatments used to modify epoxy bonding to alumina substrates can be found in "Synthesis and Characterization of Aminopropyltriethoxysilane-Polydopamine Coatings," by Knorr, D. B., Jr.; Tran, N. T.; Gaskell, K. J.; Orlicki, J. A.; Woicik, J. C.; Jaye, C.; Fischer, D. A.; Lenhart, J. L. (Langmuir, 32, 2016, 4370-4381) and "Polydopamine and Polydopamine-Silane Hybrid Surface Treatments in Structural Adhesive Applications," by Tran, N. T.; Flanagan, D. P.; Orlicki, J. A.; Lenhart, J. L.; Proctor, K. L.; Knorr, D. B., Jr. (Langmuir, 34, 2018, 1274-1286), which are both hereby incorporated by reference. Details of the poly(acrylate-maleimide) polymer synthesis and characterization can be found in "Side chain length impacting thermal transitions and water uptake of acrylate-maleimide copolymers with pendent catechols," by Bartucci, M. A.; Napadensky, E.;

Lenhart, J. L.; Orlicki, J. A. (RSC Adv., 7, 2017, 49114-49118), which is hereby incorporated by reference.

One of skill in the art would recognize that these improved adhesives can be used in a variety of fields, including but not limited to Sporting goods, Automotive assembly, electronic assembly, marine applications, furniture assembly, footwear assembly, and residential and commercial construction applications.

Figure 6:
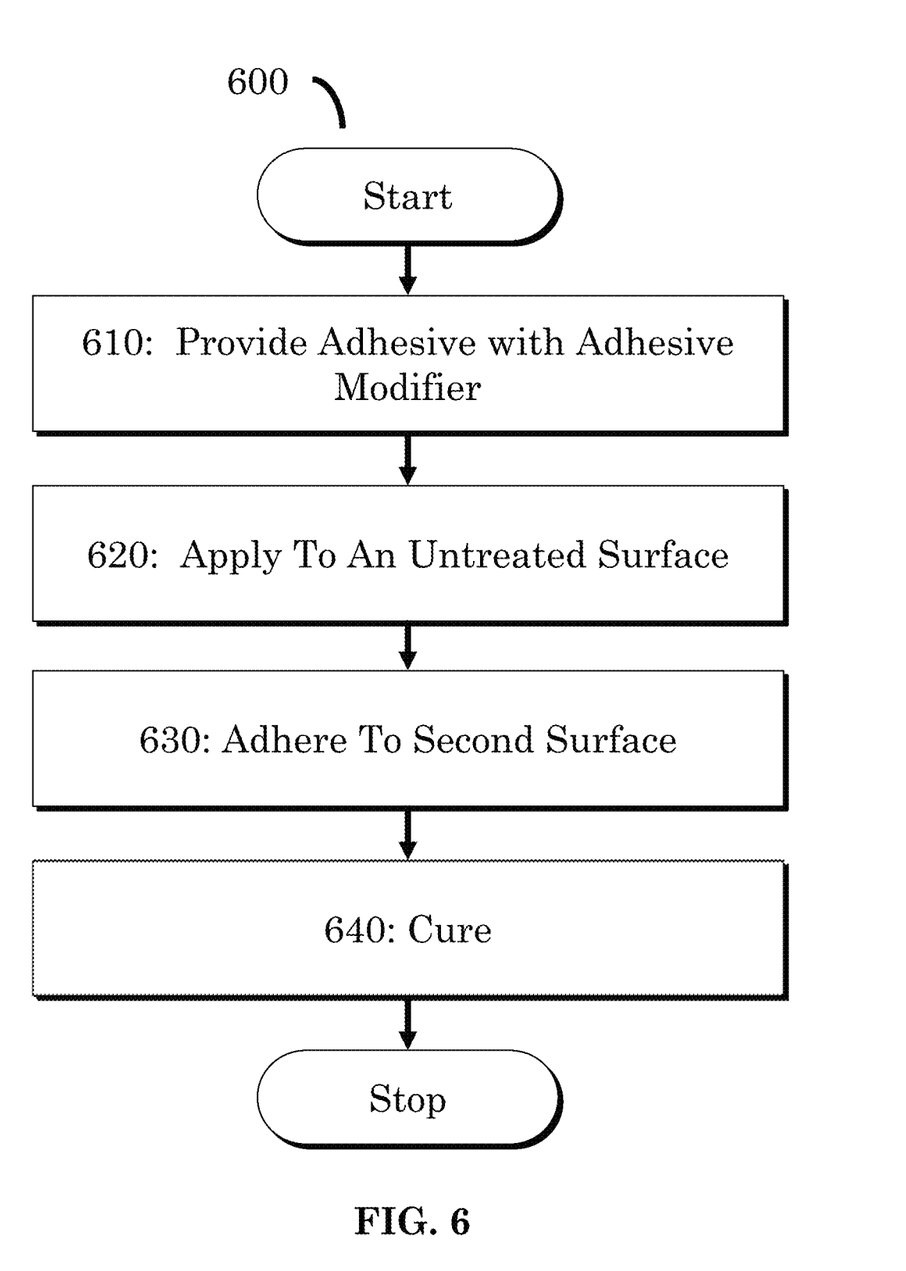
FIG. 6 is a flowchart describing a method for utilizing the improved adhesive.

An example method (600) is depicted in FIG. 6. There, once the adhesive with the adhesive modifier is provided (610), it is applied to a first untreated surface (620). The first surface is then adhered to a second untreated surface (630) and this is then allowed to cure (640) as appropriate for the adhesive in question.

It should be emphasized that the above-described embodiments are merely possible examples of implementations. Many variations and modifications may be made to the above-described embodiments. All such modifications and variations are intended to be included herein within the scope of the disclosure and protected by the following claims. Obviously, many modifications and variations of the present invention are possible in light of the above teachings.

All references listed herein are also part of the application and are incorporated by reference in their entirety as if fully set forth herein.

What is claimed is:

1. An improved adhesive, comprising:
   a base adhesive formulation; and
   an adhesive modifier present in an amount less than 2% by weight of the total weight of the improved adhesive,
   wherein the adhesive modifier comprises a copolymer having a first monomer having a bis-hydroxyl substitution with hydroxyl groups positioned ortho to each other on a benzene ring, and a second monomer that is an acrylate monomer.

2. The improved adhesive according to claim 1, wherein the first monomer is a dopamine monomer, a maleimide-dopamine monomer, or a derivative thereof.

3. The improved adhesive according to claim 1, wherein the second monomer is an acrylate with a branched or straight alkyl side chain of between 1 and 12 carbons.

4. The improved adhesive according to claim 1, wherein the base adhesive is selected from the group consisting of an epoxy, an acrylate-based adhesive, a thermoplastic elastomers (TPE), and a thermoplastic urethane or urea (TPU).

5. The improved adhesive according to claim 1, wherein the adhesive modifier is present in an amount less than 1% by weight of the total weight of the improved adhesive.

6. The improved adhesive according to claim 1, wherein the adhesive modifier is present in an amount between 0.2% and 0.6% by weight of the total weight of the improved adhesive.

7. The improved adhesive according to claim 1, wherein the mole fraction of the first monomer in the copolymer is between 0.1 and 0.5.

* * * * *